Patented May 19, 1936

2,041,086

UNITED STATES PATENT OFFICE 2,041,086

ART OF BORING WELLS IN CAVERNOUS STRATA

Jolly W. O'Brien, Houston, Tex., assignor to National Pigments & Chemical Company, St. Louis, Mo., a corporation of Missouri No Drawing. Application December 22, 1932, Serial No. 648,517

5 Claims. (Cl. 166—21)

This invention relates to the art of boring wells and more particularly in or through strata in which cavernous formations are encountered.

Cavernous strata, which is here used in the broad sense, are encountered in drilling through cap rock and salt formations and various other formations and strata. They occur in various forms such as fractures, crevices, honey-comb strata, channels and caverns which may be wholly hollow and a number of feet deep, or honey-combed so that the drill will practically drop therethrough. Some of these cavernous formations or cavities are even brought about by the action of the drilling fluid which may have a solvent action on soluble components of the strata.

Such cavernous strata or formation cause considerable trouble. Where a drilling fluid is used, such as in rotary drilling, there may be a loss of returns, since part or all of the drilling fluid may pass into the formation and disappear so as not to return to the surface; this not only results in loss of drilling fluid, but in failure to bring the cuttings to the surface, as well as failure to lubricate the bit. Furthermore deflection of the drill stem may be brought about in passing through such strata with the result of twisting, sticking and breaking of the drill stem, requiring expensive fishing jobs. While such conditions may in some cases be remedied by the setting of a casing, this is an expensive proceeding if it has to be resorted to every time that cavities are encountered, and then the result may not be satisfactory.

In some cases the cavernous strata or formation may be filled by the use of cement; however, where, as of necessity, the cement must be in the form of a slurry, the result will be that water readily separates out so that even if cement is deposited at the bottom of the bore hole or in the region of the cavernous strata, there will be a space left above the cement which is unoccupied except by water. This is further aggravated by the addition of water from the formation to the cement, causing thinning out of the slurry and the same running off into the strata without plugging the same. It is, of course, known that cement does not have any appreciable angle of rest or repose, but spreads out flat so that no mound will be formed, and the cement will distribute laterally into the strata without plugging the cavities. In order to overcome this difficulty resort has been had to fillers of saw dust, shavings, moss and other materials, but the result has not been satisfactory.

It may, therefore, be stated that no reliable means has heretofore been developed of plugging cavernous strata, particularly of any extent; accordingly wells have actually been abandoned on account of either the impossibility of filling the cavities encountered or on account of the cost being so great as to not warrant a remedy of the situation. This condition is not limited to oil or gas wells, but to other deep wells, examples of which are sulphur wells.

One of the objects of this invention, therefore, is to provide means whereby cavernous strata may be efficiently plugged.

Further objects will appear from the detail description in which will be described an embodiment of this invention; it will be understood, however, that this invention is capable of various and rather wide application, both as to methods and means employed.

Generally stated and in accordance with this invention, there is introduced into the well, and particularly in the region of the cavernous strata, a mass which has a substantial angle of repose or rest and which will set without flowing for an extended distance into the cavity or cavities encountered, and whereby the cavernous formation may be efficiently plugged with a minimum of material. A suitable material is a settable cementitious mass having a substantial angle of repose or rest and preferably of a gel formation and having water absorbing properties without becoming thin. Such a mass is introduced into the well by depositing the same at the bottom of the bore hole or at the region of the cavernous strata. Where the mass has a substantial angle of repose or rest, it is capable of building up, and where necessary successive portions are introduced with a setting period between the deposits. After setting, it is then possible to drill through the mass, and the cavernous strata will be sealed.

As an illustrative embodiment of this invention, the mass comprises a highly colloidal concentrated clay adapted to absorb a high percentage of water and adapted to form with a small percentage of the colloidal clay, an efficient gel. Such a colloidal clay is bentonite, whose properties in this respect are well known. As an example, 94 parts of Portland cement and 2 to 5 parts of bentonite (both by weight—dry) are mixed with the proper amount of water (about 8 gallons per sack of 100 pounds) and in a manner preferably as now described. The water is placed in a vat and the required amount and proportion of bentonite is mixed with the water so as to produce a light and fluid gel having the consistency of heavy lubricating oil. With this is then mixed the required amount of cement so as to produce a plastic fluid or jellylike mass having a weight of about 14 pounds per gallon. Such a mass has an angle of repose of between 45° and 60° and the cement will set in that angle, while neat cement will not only settle to an angle of repose of nearly 0° but the water will rise to the top so as to leave a substantial volume above the cement. In this mixture, however, the cement will be suspended in the gel, the bentonite being water absorbing.

In proceeding, for instance, to plug a cavity of substantial depth, after such cavities are encountered, it is desirable to note the measurement of the top of the cavity. If possible the drilling should be proceeded with to the bottom of the cavity and for a reasonable depth therebeyond, although this is not always necessary. The total depth is then measured with the drill stem at the bottom of the hole. A quantity of mixture corresponding to about 100 sacks of cement with the bentonite and water incorporated as previously described is then pumped into the drill stem, and as the mixture is being discharged from the bottom of the drill stem the latter is raised a short distance (1 to 6 inches), the mixture being pumped in slowly and with just enough pressure to keep it moving. This, it is believed will cause the building up of a mound at the bottom of the cavity. The drill is then raised a short distance and the deposit permitted to set or harden for a period of from 4 to 6 hours. At the end of that period the drill stem is lowered to the top of the deposit and the procedure is then repeated as before, the drill stem again being raised so as to feed another deposit of the mixture on the one previously made, the drill stem is again raised and the second deposit allowed to harden or set for a like period. This procedure is continued until the top of the cavity is reached, and preferably is extended to from 15 to 20 feet above the top of the cavity. The whole is then permitted to set for 24 hours with the application of a pressure of from 50 to 100 pounds per square inch on the casing head. Drilling can then be proceeded with and it is desirable in such a case to employ a drilling fluid having ample colloidal material, as by addition of bentonite to the drilling fluid or by use of bentonite and water; for this will seal up any small interstices left unfilled.

The above is a procedure for plugging rather large cavities, but the same procedure can be followed generally for the filling of crevices, even those extending at an angle to the bore hole and in the plugging of honey-combed formations. It is believed that in addition to the characteristic of the mass of having a substantial angle of rest permitting the building up of mounds, the viscosity of the mass will, by its viscosity and its water tightness and absorbing qualities, restrict the flowing of the mass any extended distance into the cavities or crevices so as to act as efficient plugs, distinguishing in this way from cement which has no appreciable angle of repose and further will cause a void on account of the water settling out to say nothing of the cement becoming thinned by water in the formation. The procedure can also be followed with advantage by first setting a casing and then a liner extending through the formation, and pumping the mixture through the bottom of and around the liner which may be sealed from the casing by suitable packing.

It will be understood that the procedure, means and composition employed for effecting the desired results, are merely illustrative and that this invention contemplates various and modifications in accordance with the conditions and situations encountered. All of these are contemplated by this invention. It is, therefore, to be understood that this invention is not to be limited to the specific embodiments described.

Having thus described the invention, what is claimed is:

1. In the art of boring wells in cavernous strata, the process comprising, depositing at the bottom of the bore hole adjacent the cavernous strata successive portitons of a settable cementitious mass of gel formation having a substantial angle of repose with a setting period between the deposits and drilling through the masses after the same have set.

2. In the art of boring wells in formations where cavernous strata extend laterally of the bore hole, the process comprising, boring until the cavernous formation is penetrated, then depositing in the bore hole and adjacent cavernous strata sufficient of a settable cementitious mass to fill the mouths of the cavernous strata at the bore hole, said cementitious mass containing sufficient colloidal clay of gel formation to impart a substantial angle of repose thereto.

3. In the art of boring wells in formations where cavernous strata extend laterally of the bore hole, the process comprising, boring until the cavernous formation is penetrated, then depositing in the bore hole and adjacent cavernous strata sufficient of a settable cementitious mass of gel formation to fill the mouths of the cavernous strata at the bore hole, said cementitious mass having an angle of repose sufficient to confine the lateral flow of the mass substantially close to the bore hole.

4. In the art of boring wells in formations where cavernous strata extend laterally of the bore hole, the process comprising, boring until the cavernous formation is penetrated, then depositing in the bore hole and adjacent cavernous strata sufficient of a settable cementitious mass of gel formation to fill the mouths of the cavernous strata at the bore hole, said cementitious mass having an angle of repose sufficient to confine the lateral flow of the mass substantially close to the bore hole, permitting the mass to set, and thereafter drilling through the mass.

5. In the art of boring wells in formations where cavernous strata extend laterally of the bore hole, the process comprising, mixing water and bentonite to form a fluid gel, admixing hydraulic cement to the gel to form a plastic mass, depositing sufficient of the plastic mass in the bore hole adjacent the cavernous strata to fill the mouths thereof, permitting the mass to set, and boring through the set mass.

JOLLY W. O'BRIEN.